(12) United States Patent
Salim et al.

(10) Patent No.: US 11,419,139 B2
(45) Date of Patent: Aug. 16, 2022

(54) UPLINK MULTIPLEXING IN CELLULAR WIRELESS COMMUNICATION NETWORKS

(71) Applicant: JRD Communication (SHENZHEN) LTD, Guangdong (CN)

(72) Inventors: Umer Salim, Guangdong (CN); Trung Kien Le, Guangdong (CN)

(73) Assignee: JRD COMMUNICATION (SHENZHEN) LTD., Shenzhen (CN)

( * ) Notice: Subject to any disclaimer, the term of this patent is extended or adjusted under 35 U.S.C. 154(b) by 0 days.

(21) Appl. No.: 16/760,858

(22) PCT Filed: Dec. 9, 2019

(86) PCT No.: PCT/CN2019/124025
§ 371 (c)(1),
(2) Date: Apr. 30, 2020

(87) PCT Pub. No.: WO2020/125472
PCT Pub. Date: Jun. 25, 2020

(65) Prior Publication Data
US 2021/0329688 A1    Oct. 21, 2021

(30) Foreign Application Priority Data

Dec. 20, 2018    (GB) ..................................... 1820784

(51) Int. Cl.
*H04W 72/14*    (2009.01)
*H04L 1/18*    (2006.01)
(Continued)

(52) U.S. Cl.
CPC ............. *H04W 72/14* (2013.01); *H04L 1/188* (2013.01); *H04L 1/1812* (2013.01);
(Continued)

(58) Field of Classification Search
None
See application file for complete search history.

(56) References Cited

U.S. PATENT DOCUMENTS 10,945,251 B2 * 3/2021 Nogami ............. H04W 72/042
2018/0123759 A1   5/2018 Zhang et al.
(Continued)

FOREIGN PATENT DOCUMENTS

| CN | 108667579 A | 10/2018 |
|---|---|---|
| CN | 108738135 A | 11/2018 |

(Continued)

OTHER PUBLICATIONS

"UL inter-UE transmission prioritization and multiplexing", Huawei, HiSilicon, 3GPP TSG RAN WG1 Meeting #94, R1-1808099, Aug. 11, 2018.
(Continued)

*Primary Examiner* — Anh Ngoc M Nguyen
(74) *Attorney, Agent, or Firm* — PV IP PC; Wei Te Chung; Ude Lu

(57) ABSTRACT

Systems and methods to allow multiplexing of uplink transmissions over configured-grant resources. If a base station allocates configured-grant uplink transmission resources to a further UE the base station transmits an indication of the overlap to relevant UEs. The UEs may apply an explicit HARQ feedback process, or other techniques to manage transmissions such as transmitting a scheduling request with the data.

16 Claims, 8 Drawing Sheets

(51) Int. Cl.
*H04L 5/00* (2006.01)
*H04W 72/12* (2009.01)

(52) U.S. Cl.
CPC ....... *H04L 5/0055* (2013.01); *H04W 72/1268* (2013.01); *H04W 72/1289* (2013.01)

(56) References Cited

U.S. PATENT DOCUMENTS

| | | | |
|---|---|---|---|
| 2019/0045546 A1* | 2/2019 | Li | H04W 74/0841 |
| 2019/0098612 A1* | 3/2019 | Babaei | H04W 72/1289 |
| 2020/0281012 A1* | 9/2020 | Behravan | H04W 72/1284 |
| 2020/0328866 A1* | 10/2020 | Du | H04L 5/0064 |
| 2020/0336255 A1* | 10/2020 | Wong | H04L 1/1861 |
| 2021/0136811 A1* | 5/2021 | Cao | H04L 1/1864 |
| 2021/0153207 A1* | 5/2021 | Bhamri | H04L 5/0048 |
| 2021/0168824 A1* | 6/2021 | Lin | H04W 72/10 |
| 2021/0243784 A1* | 8/2021 | Goto | H04W 72/1247 |
| 2021/0250927 A1* | 8/2021 | Liu | H04W 72/087 |
| 2021/0274494 A1* | 9/2021 | Feng | H04L 5/00 |
| 2021/0274530 A1* | 9/2021 | Sebire | H04W 72/1284 |

FOREIGN PATENT DOCUMENTS

| | | |
|---|---|---|
| EP | 3 331 190 A1 | 6/2018 |
| EP | 3 579 641 A1 | 12/2019 |
| WO | 2018/058743 A1 | 4/2018 |
| WO | 2018/143689 A1 | 8/2018 |
| WO | WO-2018200748 A1 * | 11/2018 ........ H04W 72/1268 |

OTHER PUBLICATIONS

"Discussion on HARQ-ACK feedback over PUCCH and PUSCH", Fujitsu, 3GPP TSG RAN WG1 Meeting #94bis, R1-1810596, Oct. 12, 2018.
"Remaining issues in explicit uplink HARQ-ACK feedback", Sony, 3GPP TSG RAN WG1 Meeting #93, R1-1807245, May 25, 2018.
"Consideration on multi-beam operation enhancements", CATT, 3GPP TSG RAN WG1 Meeting #94bis, R1-1810556, Oct. 8, 2018.
"Introduction of Physical Layer Enhancements for NR URLLC", 3GPP TSG-RAN WG1, Meeting #99, R1-1913648, Nov. 18-22, 2019.
"Introduction of Ultra Reliable Low Latency Communications Enhancements", 3GPP TSG-RAN WG1, Meeting #99, R1-1913649, Nov. 18-22, 2019.
"SLS Study on Realization of Stringent Reliability in Mode-4 NR-V2X", 3GPP TSG-RAN WG1, Meeting#94, R1-1808294, Aug. 2018.
"Remaining issues on multiplexing data with different transmission durations", 3GPP TSG RAN WG1, Meeting 91, R1-1719798, Dec. 1, 2017.

* cited by examiner

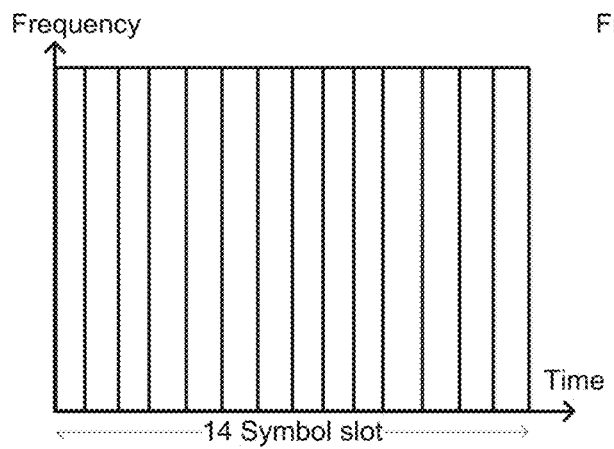 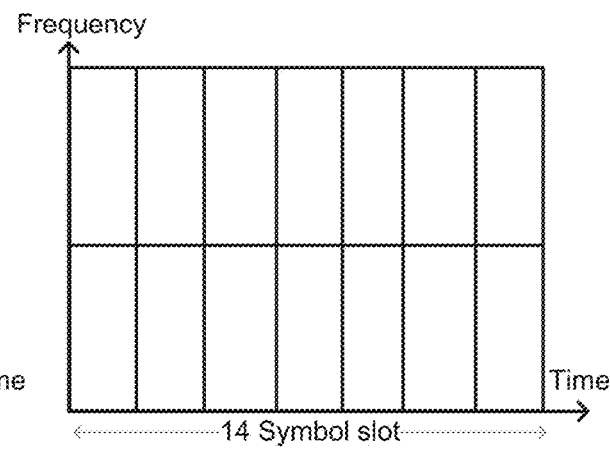
Figure 4 (A)
1 bit in bitmap indicates one OFDM symbol over all the PRBs
Figure 4(B)
1 bit in bitmap indicates two OFDM symbols over half the PRBs 1 bit in bitmap indicates 1/14$^{th}$ of PRBs over the slot 1 bit in bitmap indicates 1/7$^{th}$ of PRBs over one half-slot (7 symbols).

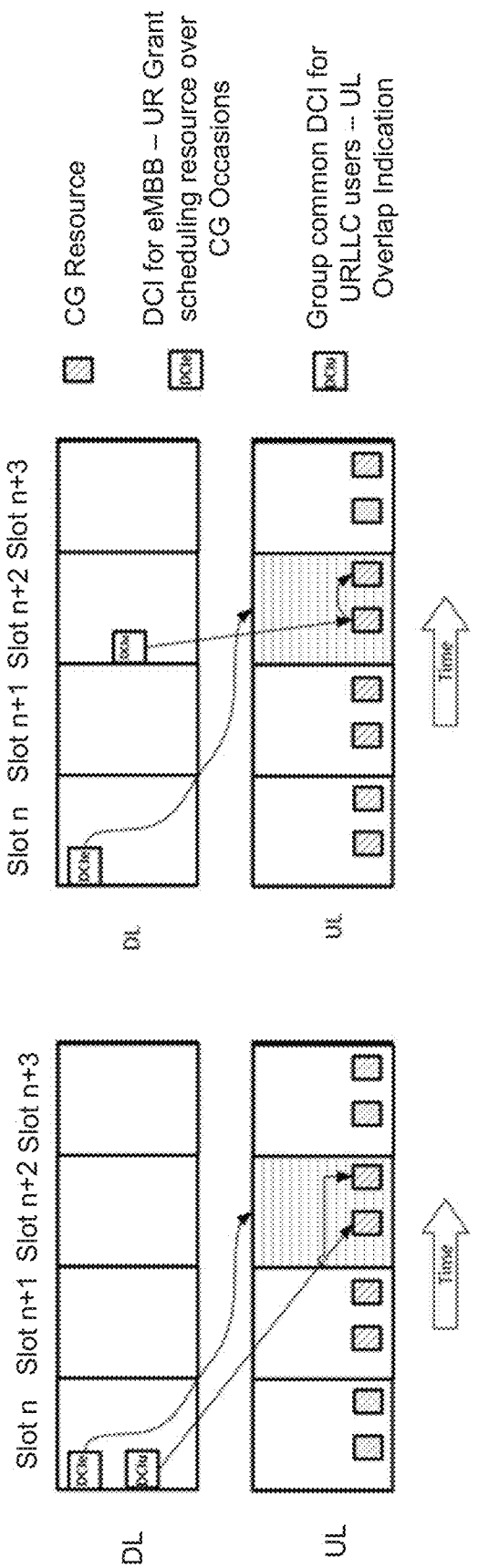

UPLINK MULTIPLEXING IN CELLULAR WIRELESS COMMUNICATION NETWORKS

TECHNICAL FIELD

The following disclosure relates to transmission strategies for uplink multiplexing in cellular communication networks, and in particular to the indication of multiplexing situations and the strategies to overcome such situations for uplink transmissions.

BACKGROUND

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards a broadband and mobile system.

In cellular wireless communication systems User Equipment (UE) is connected by a wireless link to a Radio Access Network (RAN). The RAN comprises a set of base stations which provide wireless links to the UEs located in cells covered by the base station, and an interface to a Core Network (CN) which provides overall network control. As will be appreciated the RAN and CN each conduct respective functions in relation to the overall network. For convenience the term cellular network will be used to refer to the combined RAN & CN, and it will be understood that the term is used to refer to the respective system for performing the disclosed function.

The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB. NR is proposed to utilise an Orthogonal Frequency Division Multiplexed (OFDM) physical transmission format.

A trend in wireless communications is towards the provision of lower latency and higher reliability services. For example, NR is intended to support Ultra-reliable and low-latency communications (URLLC) and massive Machine-Type Communications (mMTC) are intended to provide low latency and high reliability for small packet sizes (typically 32 bytes). A user-plane latency of 1 ms has been proposed with a reliability of 99.99999%, and at the physical layer a packet loss rate of $10^{-5}$ or $10^{-6}$ has been proposed.

In contrast to URLLC and mMTC services, mobile broadband services such as eMBB (enhanced Mobile Broad Band) aim to provide high capacity data services to UEs, but with less-strict latency and reliability requirements. eMBB services can consume large amounts of transmission resources to provide the required service which has consequences for the provision of other services, particularly those with stringent latency requirements.

In order to improve latency, URLLC and mMTC protocols may use a configured-grant system (also known as grant-free transmission). In such systems transmission resources are configured for use by one or more UEs on a static or semi-static basis. The UEs may then use those configured grant resources at their discretion without having to transmit a scheduling request and waiting to be allocated resources. However, a drawback of configured-grant resources is that if the UEs to which the resources are allocated do not require the resources they are wasted leading to inefficient use of transmission resources.

If a base station receives a scheduling request, for example for an eMBB service, it may choose to multiplex an eMBB service over the transmission resources which have been pre-allocated to one or more UEs in the configured-grant manner. That is, the base station allocates overlapping resources for the eMBB uplink transmissions. If the configured-grant UE uses the resources there may be interference between the two transmission, degrading the probability of one or both transmissions being successfully received.

Configured-grant services often use a timer-based HARQ procedure in which the UE assumes a transmission is successfully received if a re-transmission request is not received within a certain time. This is an efficient process with low latency where the channel conditions are good. However, a collision between a configured-grant transmission and another transmission (such as eMBB) may degrade the configured-grant transmission so much that the base station cannot identify the UE which made the transmission. In such cases the UE's uplink transmission is not successfully received, but the UE does not receive a re-transmission request. The UE will thus ultimately assume the transmission was received and delete the data which is consequently lost.

There is therefore a requirement for a robust and efficient method of multiplexing services in configured-grant transmission resources.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided a method for multiplexing uplink transmission resources in a cellular wireless communications network, comprising the steps of at a base station allocating first uplink transmission resources to a first UE and transmitting an indication of those transmission resources to the first UE; at the base station allocating second uplink transmission resources to a second UE, wherein the second uplink transmission resources overlap with the first uplink transmission resources; transmitting an overlap indication from the base station to the first UE indicating the overlap of transmission resources; and at the first UE applying an explicit HARQ feedback process for uplink transmissions made in the overlapping resources.

There is also provided a method for multiplexing uplink transmission resources in a cellular wireless communications network, the method performed at a base station and comprising the steps of allocating first uplink transmission resources to a first UE and transmitting an indication of those transmission resources to the first UE; allocating second uplink transmission resources to a second UE, wherein the second uplink transmission resources overlap with the first uplink transmission resources; transmitting an overlap indication from the base station to the first UE indicating the overlap of transmission resources; and when receiving a transmission from the first UE on the first uplink transmission resources transmitting a HARQ feedback message.

There is also provided a method for multiplexing uplink transmission resources in a cellular wireless communications network, the method performed at a first UE and comprising the steps of receiving a signal indication allocation of first uplink transmission resources to the first UE; receiving an overlap indication from the base station indicating the overlap of transmission resources; and applying an explicit HARQ feedback process for uplink transmissions made in the overlapping resources.

The overlap indication may comprise an indication of the resources that overlap.

The indication of the resources that overlap may comprise a bitmap, wherein each bit relates to a frequency portion of the physical resource blocks over a full slot.

The indication of the resources that overlap may comprise a bitmap, wherein each bit relates to a frequency portion of the physical resource blocks over half a slot.

The bitmap may consist of 14 bits.

The overlap indication may be transmitted in a DCI message.

The DCI message may be a group-common DCI message.

The explicit HARQ process may require the UE to wait for an ACK message from the base station for a predefined window after an uplink transmission of data before re-transmitting the data.

The predefined window may be set to a time of zero.

The overlap indication is transmitted prior to the occurrence of the first uplink transmission resources which overlap with the second uplink transmission resources.

The overlap indication may be transmitted at the same time as a message to the second UE indicating the second uplink transmission resources.

The overlap indication may be transmitted in the slot within which the first uplink transmission resources which overlap with the second uplink transmission resources.

The overlap indication may further comprise an indication of modified transmission parameters for use for transmissions made by the first UE in overlapping resources.

The modified transmission parameters may indicate an increased transmission power or an increased number of repetitions.

The overlap indication may further comprise an indication for the first UE to transmit a Scheduling Request in addition to a data transmission made in the overlapping resources.

The Scheduling Request may be transmitted as uplink control information on dedicated PUCCH resources.

The Scheduling Request may be transmitted as uplink control information on PUSCH resources.

The overlap indication may be transmitted after the occurrence of the first uplink transmission resources which overlap with the second uplink transmission resources.

In non-overlapping resources the UE may apply a timer based HARQ system in which the UE assumes data is successfully received by the base station unless a NAK is received in the form of an UL grant.

There is also provided a base station configured to perform the methods described herein.

There is also provided a UE configured to perform the methods described herein.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, an EPROM, an Electrically Erasable Programmable Read Only Memory and a Flash memory.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

FIGS. 4 and 5 show mappings for resource indications;

FIG. 6 shows example timings for transmissions; and

DETAILED DESCRIPTION OF THE PREFERRED EMBODIMENTS

Those skilled in the art will recognise and appreciate that the specifics of the examples described are merely illustrative of some embodiments and that the teachings set forth herein are applicable in a variety of alternative settings.

Figure 1:
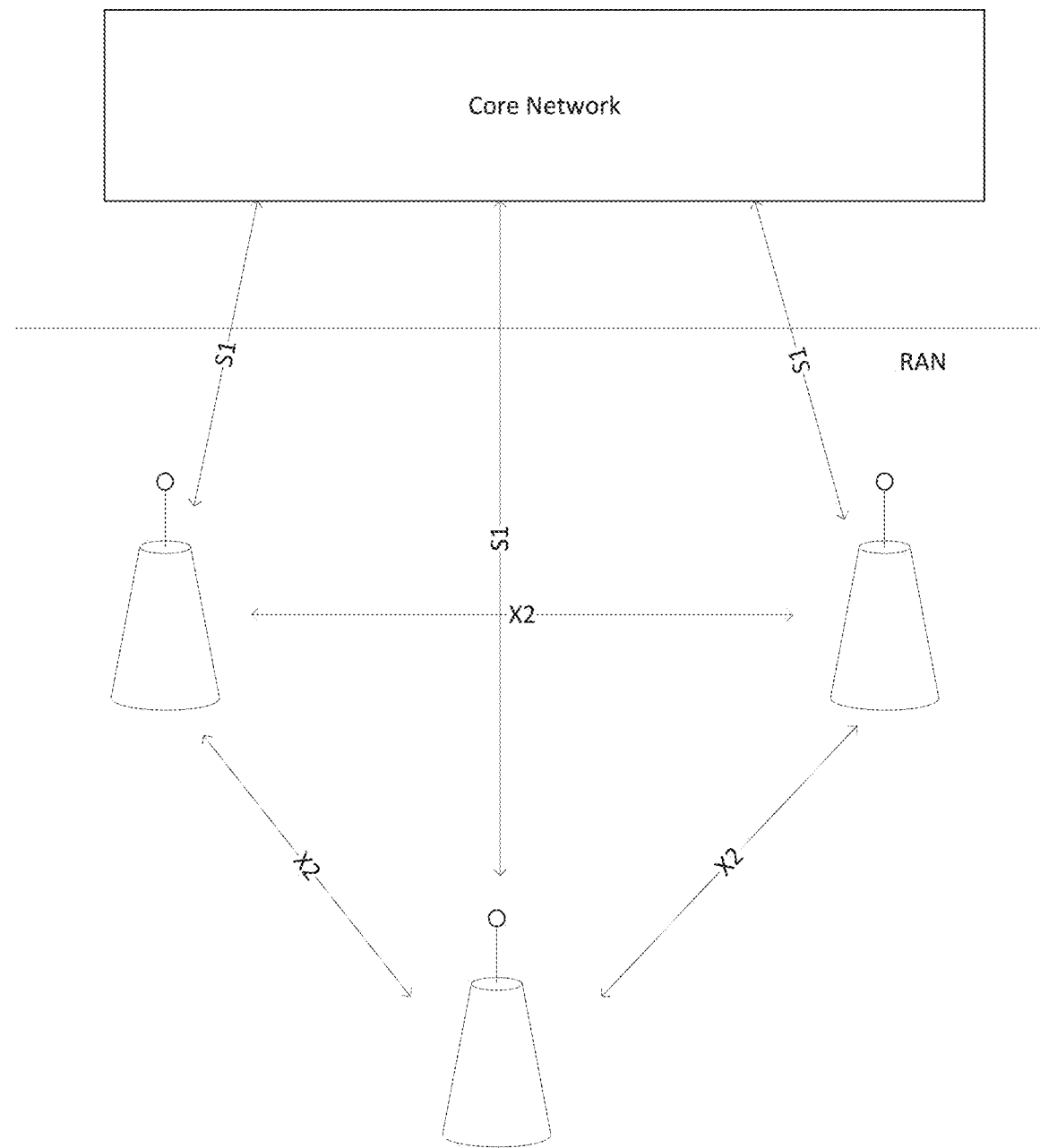
FIG. 1 shows a schematic diagram of parts of a cellular network.

FIG. 1 shows a schematic diagram of three base stations (for example, eNB or gNBs depending on the particular cellular standard and terminology) forming a cellular network. Typically, each of the base stations will be deployed by one cellular network operator to provide geographic coverage for UEs in the area. The base stations form a Radio Area Network (RAN). Each base station provides wireless coverage for UEs in its area or cell. The base stations are interconnected via the X2 interface and are connected to the core network via the S1 interface. As will be appreciated only basic details are shown for the purposes of exemplifying the key features of a cellular network.

The base stations each comprise hardware and software to implement the RAN's functionality, including communications with the core network and other base stations, carriage of control and data signals between the core network and UEs, and maintaining wireless communications with UEs associated with each base station. The core network comprises hardware and software to implement the network functionality, such as overall network management and control, and routing of calls and data.

In the following disclosure the term "eMBB UE" will be used to describe a UE utilising an eMBB-type service (a service with an emphasis on capacity rather than latency and reliability), and "URLLC UE" will be used to describe a UE utilising a URLLC-type service (a service with an emphasis on latency and reliability rather than capacity). This does not suggest the UEs are different and only able to operate with those services, but only that they are using those services at the time under discussion.

Figure 2:
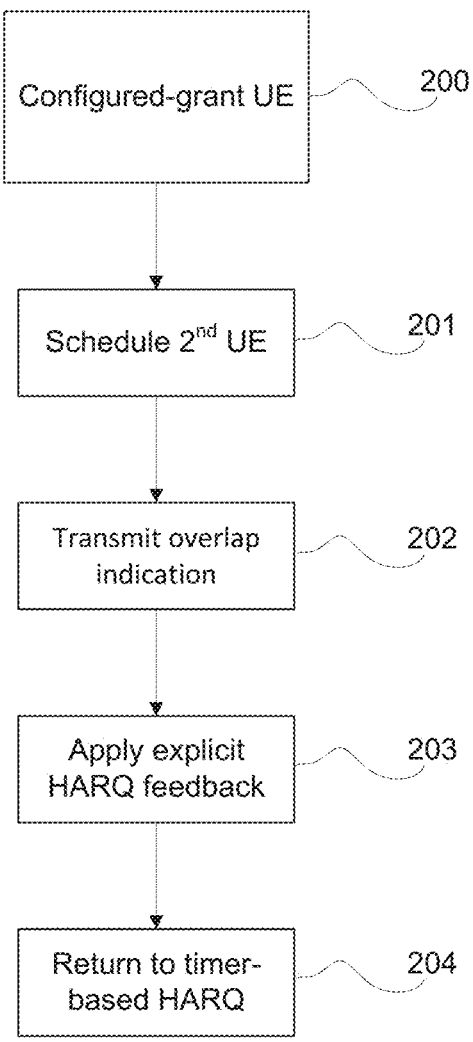
FIG. 2 shows a flow chart of an example method of feedback control.

FIG. 2 shows a transmission process which seeks to improve multiplexing of configured-grant resources, whilst maintaining efficient use of control resources. At step 200 a UE has been allocated configured-grant transmission resources and is free to transmit within those resources when desired. The resources may actually be configured for more than one UE, and the term "a UE" should be construed accordingly.

At step 201 the base station intends to schedule an uplink transmission using overlapping resources, thus creating the potential for degradation of a transmission by the configured-grant UE. At step 202 the base station transmits an overlap indication to UEs with overlapping configured-grant resources. When received by the configured-grant UEs this gives an indication that any uplink transmissions made in the overlapping configured-grant resources may be susceptible to increased interference.

The overlap indication may include an indication of the transmission resources which overlap, or the relevant resources may be implicit (for example, an indication may be an implicit reference to the next occurrence of resources allocated to a UE). The overlap indication may indicate the specific time-frequency resources that are overlapped, which accommodates a situation in which only some of a UE's resources are overlapped.

At step 203, the UE applies an explicit HARQ feedback system to transmissions made in the overlapping resources. Thus, for transmissions made in the overlapped resources the UE will wait for an explicit acknowledgement before treating the transmitted data as successfully received. The base station is aware of the overlapping and configures itself to send acknowledgements for data received in the relevant period. For example, the lack of an acknowledgement within a certain time may trigger automatic re-transmission of the data. The data is therefore not lost even if the base station doesn't identify the source of the transmission in any way.

At step 204 the UE returns to the timer-based HARQ system (assuming safe receipt in the absence of an indication otherwise) for transmission resources which are not overlapped.

The method of FIG. 2 thereby provides a system in which an efficient timer-based HARQ system is utilised in normal operation, while also allowing multiplexing and ensuring safe reception during the period of overlap between allocated resources.

In a typical example, the configured-grant services will be URLLC services, and the overlapping resources will be allocated for an eMBB transmission which requires extensive resources.

A UE may be configured to transmit a number of repetitions of data to improve the reception probability. If a UE receives an explicit HARQ acknowledgment before completing all repetitions the UE may terminate those transmission since the UE knows that further repetitions are not required. This saves power and resources, and avoids unnecessary interference for the UE which is sharing the resources despite the initial overlap.

The parameters of the HARQ algorithm may be configured by higher-layer (RRC) signalling on a semi-static basis, or may be transmitted to the UE in the overlap indication or another message. The period to wait for an acknowledgment may be set as a function of reliability and latency targets for the UE/services. In an example, where latency and reliability targets are extremely strict, the timer value may be set to zero to force an automatic retransmission of all uplink transmissions in overlapped resources. Such an automatic retransmission (for a predetermined number of repetitions or until an acknowledgement is received) may also be implicit in the overlap indication message, rather than defined by the timer.

A specific channel may be defined for the transmission of HARQ ACK/NAK messages when explicit HARQ is utilised. For example, a channel similar to the Physical HARQ Indicator Channel (PHICH) defined in LTE. However, to minimise modifications to the standards, other mechanisms may be utilised.

In an example, an UL grant message (DCI) may be utilised to carry explicit HARQ feedback. A user-specific CS-RNTI can be utilised. If a base station successfully receives an UL configured grant transmission in an overlap slot the base station may transmit an UL grant (DCI message) to the UE including the HARQ process number (HARQ ID) of the successfully received data (transmission block). Upon receipt the UE can identify this as an explicit ACK, rather than a request for a re-transmission, due to the matching HARQ ID. For further certainty the New Data Indicator (NDI) field can also be set to zero, and other fields that are not required for this application may be set to predefined values which indicate the message as an ACK.

If the base station cannot decode a received configured grant transmission in an overlap slot but is able to identify the UE (for example through DMRS identification) the base station may transmit a NAK to the UE within the feedback window, followed by a scheduling command. To minimise latency a UL grant of re-transmission with resource assignments may be sent to allow a quick re-transmission. If the base station cannot identify the UE no ACK or NAK is sent, and the UE will arrange re-transmission once its HARQ window expires.

The use of explicit HARQ feedback may be implicit in the receipt of the overlap indication message or may be indicated by a field of that message. For example, the base station may be aware that the configured-grant UE is already configured with a large number of repetitions, or the overlapping UE will use a low transmission power, such that it is confident the base station will receive any transmissions from the configured-grant UE. In such cases, an explicit indication can move only a subset of overlapping transmissions to explicit HARQ. An example can be that the base station indicates the overlap and only the users who have been configured with less than a certain number of repetitions, say K1, are expected to use explicit HARQ, whereas the users with transmissions configured with number of repetitions equal to or larger than K1 still use the timer based HARQ. In a different example, the explicit HARQ can trigger only for the transmissions for which the overlap occurs on a certain number of repetitions.

The overlap indication may also be utilised to indicate changes to other parameters of a configured-grant transmission. For example, the overlap-indication may include an indication to increase transmission power to improve the probability of reception, or the number of repetitions could be increased. Such changes may be implicit in receipt of an overlap indication (based on an earlier configuration) or the overlap indication may explicitly include the changes, or an indication to utilise a predefined configuration.

Figure 3:
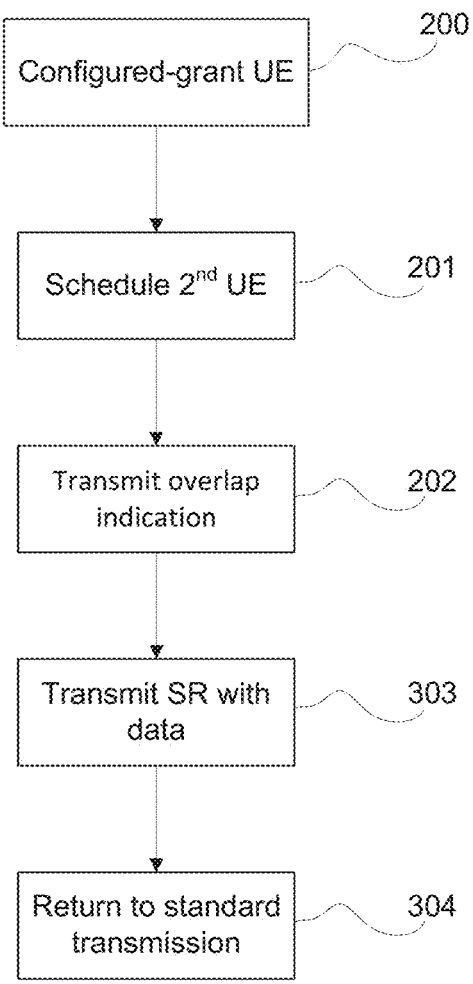
FIG. 3 shows a flow chart of an example method of transmission control.

FIG. 3 shows a variation of the method of FIG. 2. Most steps are the same as FIG. 2 shown by the consistent reference numerals. However, the overlap indication is utilised to request the UE to transmit a Scheduling Request (SR) in conjunction with the transmission of data in the configured grant resources during an overlap as shown at step 303. The SR may provide a further means, with an additional diversity mechanism, for the base station to react to a transmission in the configured grant resources which is interfered with. SR decoding is simple, and the signals provide a more reliable transmission than data transmission, as it is a single bit transmission in the form of a sequence. SR messages may thus provide a more reliable way of indicating a transmission. After transmission of the SR with the data in the overlap period, the UE returns to conventional transmission in allocated resources.

The SR may be transmitted at the same time as the data in the configured grant resources, or in proximity thereto, depending on the relative timing of SR and configured grant resources. SRs are usually transmitted on the PUCCH but simultaneous transmission of PUSCH and PUCCH may not be permitted. In such a case the SR may be transmitted in a UCI on PUSCH using the configured grant resources together with transmission of the data. If a UE is not transmitting PUSCH, it may transmit a UCI (carrying SR, ACK/NAK for DL Data, CSI reports etc) on PUCCH. However, as PUCCH resources are dedicated resources on different frequency PRBs and OFDM symbols, this provides additional diversity advantage to the SR transmitted in these resources compared to multiplexing and transmitting it over UL configured grant resources along with the data. Thus it could be beneficial to transmit SR on dedicated PUCCH resources when the UE is transmitting the transport block over the overlapping CG resources.

UEs may be configured to always listen for overlap indication messages, or this function may be activated and deactivated by a base station. For example, the function may be activated when traffic load is high and there is a high likelihood of scheduling users over existing configured grant resources. UEs may be configured to listen for the overlap indication as part of the configured-grant configuration, for example by including additional parameters in the configured-grant configuration message. Alternatively, UEs may be configured separately, when required. If UEs are configured in advance with the parameters to listen for an overlap indication, the actual function to do so may be activated or deactivated as required. This enables a single transmission of the configuration parameters, and then easy activation/deactivation with a simple flag. For example, the activation and de-activation can follow the signalling of Type 1 and Type 2 configured grants, i.e., RRC messaging could be used fora Type 1 configured grant UE, and DCI messaging could be used for a Type 2 configured grant UE.

Specific configured-grant resources may be allocated to more than one UE. Since the base station cannot know which UE is likely to use those resources in a specific period it must send the overlap indication to all UEs allocated to those resources. The Downlink Control Information (DCI) message may be appropriate for transmitting the overlap indication. A group-common DCI may be particularly convenient for signalling a group of UE allocated to particular configured-grant resources.

When utilising a group-common DCI for the overlap indication the format 2_1 may be appropriate. This format is conventionally used for DL pre-emption indication and is defined in TS 38.212, Section 7.3.1.3.2. The format may require modification to provide all functions described herein.

Format 2_1 is defined particularly for URLLC DL transmission which are typically short but utilise large amounts of frequency resources. The format provides 14 bits for resource indication, which are mapped to resources in two ways according to the resource charts shown in FIG. 4. The base station can configure one of these two mapping options to convey the DL pre-emption indication.

In contrast to URLLC transmissions, eMBB which represent the likely transmissions to which the methods disclosed herein will be applied, are likely to be scheduled for all or most of a slot. It may therefore be more appropriate to define the frequency resources more granularly than for UL pre-emption, and the time resources less granularly.

Figure 5A:
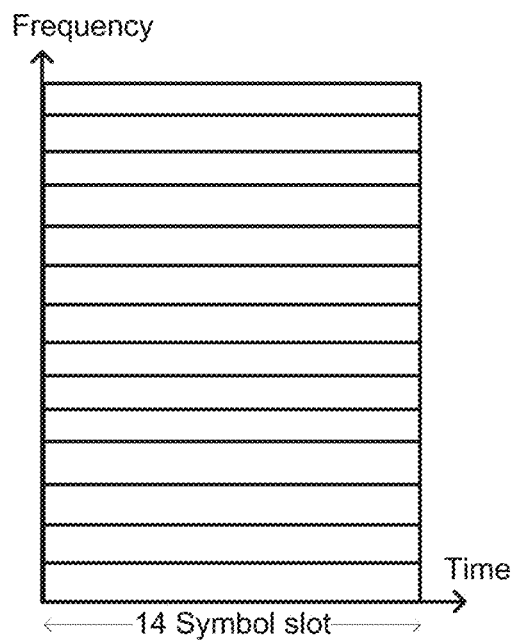
Figure 5B:
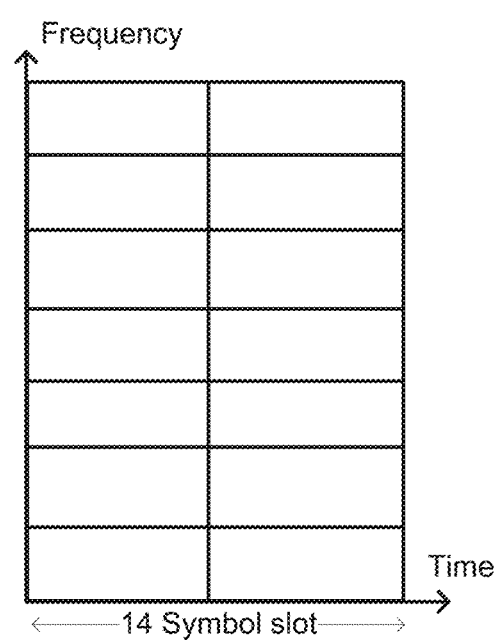

Two example formats may be:—
Use all 14 bits to indicate a frequency PRB region for the whole slot. Thus, each bit in the 14-bit long bitmap indicates $1/14^{th}$ of the frequency PRBs of the carrier. This is shown in left part of FIG. 5.
Split the time-frequency grid of the slot in 7 frequency zones each spanning one half slot. Thus, each bit may indicate an overlap over $1/7^{th}$ of the frequency PRBs for a half slot time duration. This is shown in right part of FIG. 5.

The overlap indication may be transmitted at the same as the overlapping resources are allocated, as shown in FIG. 6(*a*). Typically, a base station transmits a DCI configuring eMBB resources at the start of a slot, and so a DCI with overlap indication can be sent at the same time. Alternatively, as shown in FIG. 6(*b*), the overlap indication may be sent in a later slot. For example the overlap indication may be sent in the same slot as the configured-grant resources to which it applies. Transmitting the overlap indication in the slot to which it applies may reduce the signalling overhead required since there is no need to also indicate the slot where overlap actually occurs, as is the case with the example of FIG. 6(*a*).

In a further example, the overlap indication is transmitted in a different slot to both the DCI scheduling the overlapping resources, and the slot to which it applies. For example, in a TDD system it may not be possible to transmit the overlap indication on DL in the same slot as the UL configured-grant resources. The overlap indication could be sent in the slot immediately prior to the slot with the overlap (or the closest valid DL slot prior to the overlap slot). Transmitting the overlap indication in a prior slot allows the modification of transmission parameters, or transmission of an SR, as discussed above. However, a drawback may be that the UE does not yet know whether it will need to use the configured grant resources and hence has to listen for and decode every overlap indication in case it needs the resources. In contrast, transmitting the overlap indication in the slot with the overlap means a UE only needs to listen if it is planning to use the configured grant resources in that slot.

The overlap indication could also be transmitted in a slot later than the overlap slot, however, this precludes utilising the overlap indication to modify transmission parameters or indicate SR transmission along with the transport block. If a UE utilises configured-grant resources in a slot, the UE then listens for an overlap indication in the subsequent slot. If the indication is received the UE applies explicit HARQ feedback to the prior transmissions and does not discard the data until a positive indication is received. Such a process may reduce power consumption associated to overlap indication decoding at the UEs as only UEs which actually transmitted in the overlap slot need to listen for and decode the overlap indication.

The timing of the overlap indication may be set as part of the overlap indication configuration such that it can be varied over time or for different UEs. This also allows the base station to configure appropriate timing for the overlap indication as a function of FDD/TDD duplexing, and what strategies it plans to use to repair the overlapping transmissions.

It is likely that UEs utilised overlapping resources (typically eMBB UEs) will only be scheduled once during each slot and hence only one overlap indication is required in each slot. Thus, no additional control signal monitoring is required.

Figure 7:
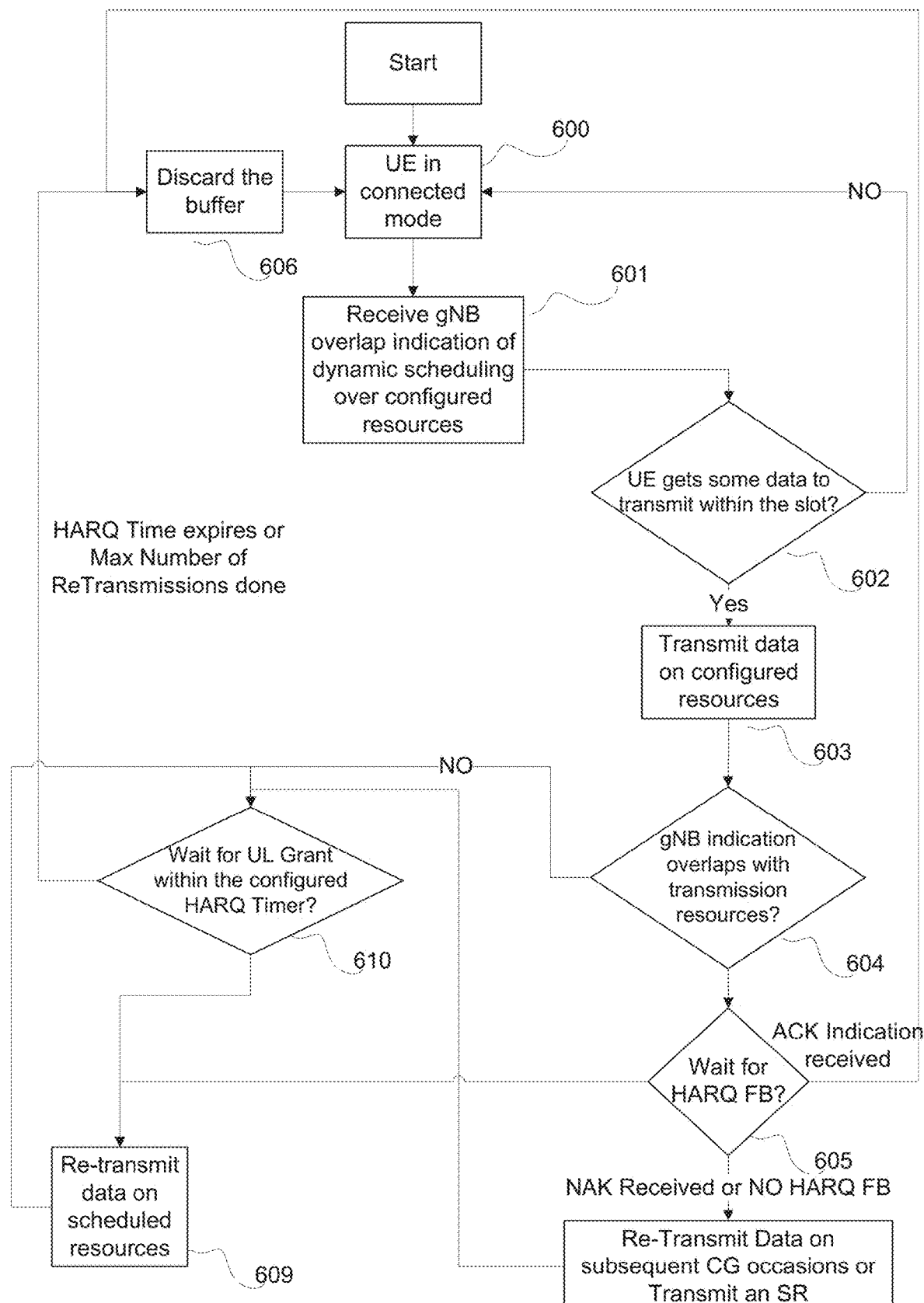
FIGS. 7 and 8 show flowcharts of example methods.

FIG. 7 shows a more detailed flow chart of a method utilising features of the current disclosure. At block 600 a configured grant UE is in connected mode, and at block 601 receives an overlap indication which is decoded and appropriate settings made.

At block 602 if the UE has no data to transmit in the overlap slot it remains in connected mode, or if the UE does have data to transmit that transmission is made at block 603. As set out above, if the overlap indication included modified transmission parameters (either implicitly or explicitly) those are utilised for the transmission. At block 604 if the overlap indication related to utilised transmission resources the process moves to block 605 and the UE waits for HARQ feedback. If an ACK is received the UE knows the data was successfully received and discards the buffer at block 606, before returning to block 600 for the next action. If no ACK is received, or a NAK is received the UE proceedings to block 607 to re-transmit the data on subsequent configured-grant resources or transmits an SR to obtain resources to make that transmission.

At block 605, the UE may also receive an UL grant (DCI) with the HARQ ID utilised for the transmission. This is an indication that the UE could be identified by the base station, but that the transmission could not be decoded. The UE thus proceeds to block 609 to make a re-transmission on the resources scheduled by the UL grant.

At block 610 the UE waits for an ACK of the re-transmission, or resource allocation. If the HARQ timer has expired, or the maximum number of re-transmissions have been performed the UE discards the buffer at block 606. If an UL grant (DCI) is received with the matching HARQ ID the data is transmitted at block 609 on the scheduled resources and the UE returns to block 610.

If the utilised resources did not overlap at block 604 the UE proceeds to wait for an UL grant at block 610 and if the HARQ timer expires without an UL grant being received the UE proceeds to block 606.

Figure 8:
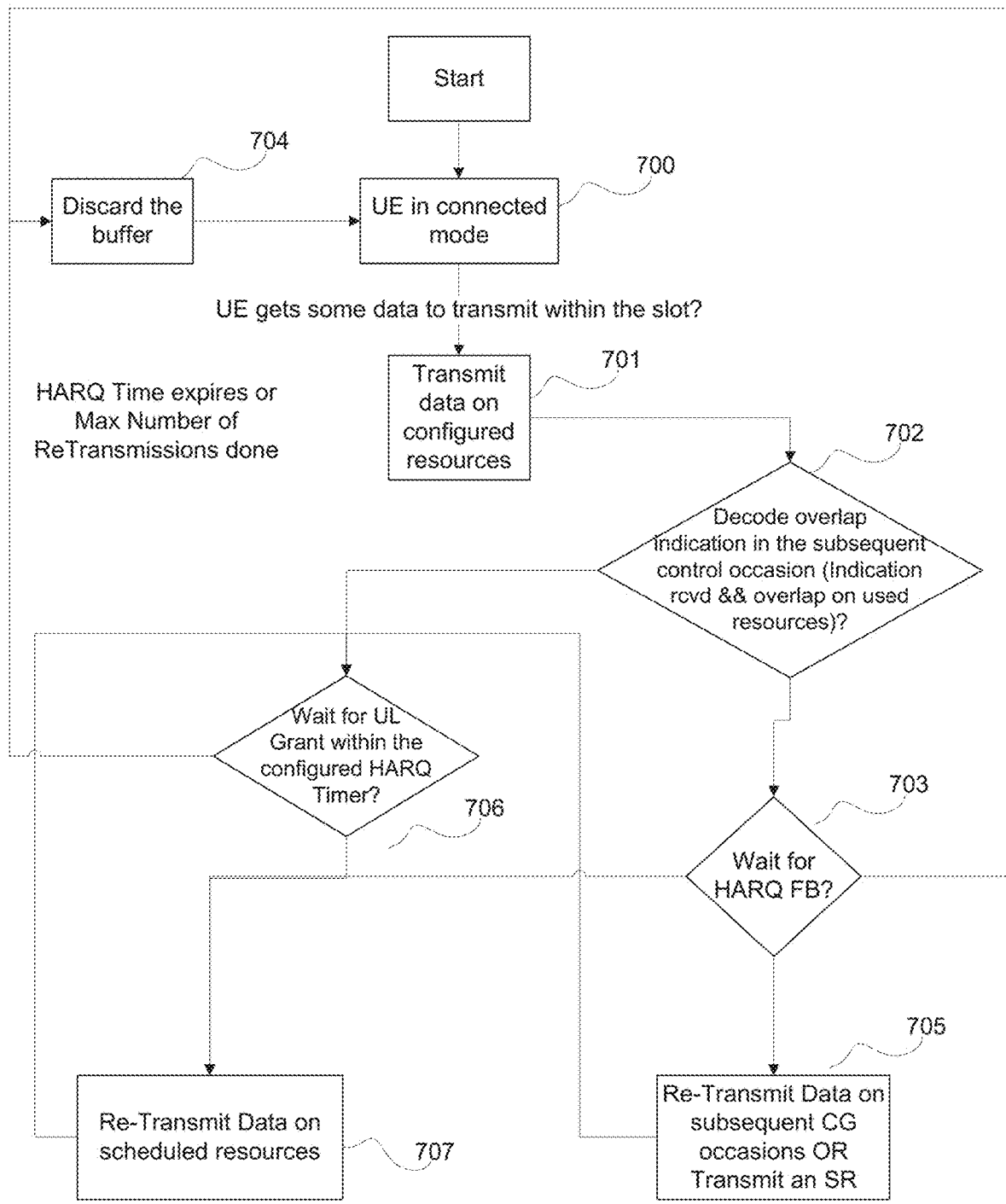

The process of FIG. 7 thus allows a mixed approach of timer-based HARQ and explicit HARQ depending on the specific situation for each transmission. FIG. 8 shows a similar process to FIG. 7, but in a system in which the overlap indication is sent after the overlap slot.

At block 700 a configured grant UE is in connected mode, and at block 701 makes a transmission on configured resources. At block 702 the UE attempts to receive and decode an overlap indication in the subsequent control occasion. If the overlap indication indicates that the relevant slot did contain an overlap on the resources used by the UE the UE proceeds to block 703 and waits for an explicit HARQ ACK. If that ACK is received the UE discards its buffer at block 704 and returns to block 700.

If no HARQ ACK is received at block 703, or a NAK received, at block 705 the UE re-transmits the data at the next configured-grant resources or transmits an SR for resources to make that retransmission as per the configuration made by the base station. At block 706 the UE waits for an UL grant within the relevant HARQ timer. If the HARQ timer expires, or the maximum number of transmissions have been completed, the UE discards its buffer at block 704 and returns to block 700. If an UL grant is received for the latest HARQ ID the data is retransmitted on the scheduled resources at block 707.

At block 703, the UE may also receive an UL grant (DCI) with the HARQ ID utilised for the transmission. This is an indication that the UE could be identified by the base station, but that the transmission could not be decoded. The UE thus proceeds to block 707 to make a re-transmission on the resources scheduled by the UL grant.

If at block 702 the overlap indication did not indicate overlapping resources the UE proceeds to block 706.

The method of FIG. 8 thus allows efficient monitoring for overlap indications, together with selection of the most-appropriate HARQ method.

Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally 45 referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory. In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices.

Thus, the elements and components of an embodiment of the invention may be physically, functionally and logically implemented in any suitable way. Indeed, the functionality may be implemented in a single unit, in a plurality of units or as part of other functional units. Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

The invention claimed is:

1. A method for multiplexing uplink transmission resources in a cellular wireless communications network, the method performed at a first UE (User Equipment) and comprising the steps of:
   receiving a signal indicating allocation of first uplink transmission resources to the first UE for a configured grant transmission; and
   receiving an overlap indication from a base station indicating an overlap of the first uplink transmission resources with uplink transmission resources allocated to at least one other UE;
   wherein the overlap indication also indicates changes to parameters of the configured grant transmission; and
   the indication of the overlap comprises an indication of the resources that overlap which comprises a bitmap of 14 bits, wherein each bit relates to a frequency portion of $1/14^{th}$ of physical resource blocks over a full slot, or a frequency portion of $1/7^{th}$ of physical resources blocks over half a slot.

2. The method according to claim 1, wherein the overlap indication is transmitted in a Downlink Control Information (DCI) message.

3. The method according to claim 2, wherein the Downlink Control Information (DCI) message is a group-common Downlink Control Information (DCI) message.

4. The method according to claim 1, further comprising applying an explicit HARQ process, wherein the explicit HARQ process requires the first UE to wait for an ACK message from the base station for a predefined window after an uplink transmission of data before re-transmitting data.

5. The method according to claim 4, wherein the predefined window is set to a time of zero.

6. The method according to claim 1, wherein the overlap indication is transmitted prior to an occurrence of the first uplink transmission resources which overlap with second uplink transmission resources.

7. The method according to claim 6, wherein the overlap indication is transmitted at a same time as a message to a second UE indicating the second uplink transmission resources.

8. The method according to claim 6, wherein the overlap indication is transmitted in the slot within which the first uplink transmission resources which overlap with the second uplink transmission resources.

9. The method according to claim 6, wherein the overlap indication further comprises an indication of modified transmission parameters for use for transmissions made by the first UE in overlapping resources.

10. The method according to claim 9, wherein the modified transmission parameters indicate an increased transmission power or an increased number of repetitions.

11. The method according to claim 6, wherein the overlap indication further comprises an indication for the first UE to transmit a Scheduling Request in addition to a data transmission made in overlapping resources.

12. The method according to claim 11, wherein the Scheduling Request is transmitted as uplink control information on dedicated PUCCH resources.

13. The method according to claim 11, wherein the Scheduling Request is transmitted as uplink control information on PUSCH resources.

14. The method according to claim 1, wherein the overlap indication is transmitted after an occurrence of the first uplink transmission resources which overlap with second uplink transmission resources.

15. The method according to claim 1, wherein in non-overlapping resources the first UE applies a timer based HARQ system in which the first UE assumes data is successfully received by the base station unless a NAK is received in a form of an UL grant.

16. A User Equipment (UE) configured to perform the method of claim 1.

* * * * *